United States Patent [19]

Huber

[11] Patent Number: 5,215,184
[45] Date of Patent: Jun. 1, 1993

[54] DRIVE ROLLER UNIT

[75] Inventor: Thomas Huber, Iffeldorf, Fed. Rep. of Germany

[73] Assignee: Bavaria Cargo Technologie GmbH, Fed. Rep. of Germany

[21] Appl. No.: 875,640

[22] Filed: Apr. 28, 1992

Related U.S. Application Data

[62] Division of Ser. No. 508,432, Apr. 13, 1990, Pat. No. 5,127,513.

[30] Foreign Application Priority Data

Feb. 8, 1990 [DE] Fed. Rep. of Germany ..... 90102497

[51] Int. Cl.$^5$ .............................................. B65G 13/02
[52] U.S. Cl. .................................... 198/782; 198/788
[58] Field of Search ................. 198/780, 782, 788; 244/137.1

[56] References Cited

U.S. PATENT DOCUMENTS

| | | | |
|---|---|---|---|
| 4,697,694 | 10/1987 | Huber | 198/782 |
| 4,792,037 | 12/1988 | Huber | 198/788 |
| 5,033,611 | 7/1991 | Huber | 198/782 |
| 5,127,513 | 7/1992 | Huber | 198/782 |

FOREIGN PATENT DOCUMENTS

| | | |
|---|---|---|
| 371784 | 3/1921 | Fed. Rep. of Germany . |
| 819063 | 10/1951 | Fed. Rep. of Germany . |
| 16438.1 | 10/1989 | Fed. Rep. of Germany . |
| 16547.7 | 2/1990 | Fed. Rep. of Germany . |
| 1489856 | 7/1967 | France . |

OTHER PUBLICATIONS

Patent Abstracts of Japan, Band 10, Nr. 25 (M-450) [2082], 31 Jan. 1986; and JP-A-60 183 412 (Shimazu Seisakusho K.K.) Sep. 18, 1985.

Primary Examiner—Joseph E. Valenza
Assistant Examiner—Tuan N. Nguyen
Attorney, Agent, or Firm—Sughrue, Mion, Zinn, Macpeak & Seas

[57] ABSTRACT

A drive roller unit for driving an article on a conveyor track includes a drive roller which can be driven in rotation by an electric motor. The drive roller is in the form of a hollow circular cylinder and the motor is accommodated in the interior thereof. The drive roller is non-rotatably connected to the stator of the motor in concentric relationship with the axis of rotation of the rotor of the motor. A runner wheel disposed at least at one axial end of the rotor shaft is in engagement with a guide track mechanism which is fixedly connected to the base of the unit and which leads upwardly with respect to the base, the runner wheel rolling along the guide track mechanism to raise the drive roller into an upper operative position to engage an article to be driven thereby. The guide track mechanism may be in the form of a guide wheel co-operable with the runner wheel.

6 Claims, 3 Drawing Sheets

DRIVE ROLLER UNIT

This is a divisional of application Ser. No. 07/508,432, filed Apr. 13, 1990 now U.S. Pat. No. 5,127,513.

BACKGROUND OF THE INVENTION

A drive roller unit for driving an article such as a freight container on a conveyor track, as described in U.S. Pat. No. 4,792,037 comprises a drive roller which can be driven in rotation by an electric motor and which is movable by means of a guide means relative to the base of the unit between a lower rest position and an upper drive position in which it is in engagement with the underside of the article to be driven. The drive roller is substantially in the form of a hollow circular cylinder, the interior of which accommodates the electric motor, with the rotor of the motor being mounted rotatably within the stator of the motor. The stator of the electric motor, which includes the field winding, is rigidly and non-rotatably connected to a stator housing which serves as a guide body. The guide body has a circular-cylindrical outside peripheral surface which is eccentric with respect to the axis of rotation of a drive gear, which axis is stationary with respect to the base of the unit. The drive roller is mounted rotatably on the outside surface of the guide body. With that design configuration, when the motor is switched on, the rotor which is disposed in the interior of the stator initially remains in a stationary condition because of its inherent inertia and by virtue of a step-down transmission which applies a braking effect thereto, and a special brake. As a result the motor torque acting between the rotor and the stator rotates the stator arrangement and therewith the guide body formed by its housing, around the axis of rotation of the drive gear which meshes with an internal tooth arrangement in the drive roller. As a result, because the guide body is eccentric with respect to the axis of rotation of the drive gear, the drive roller which is mounted thereon is moved out of its lower rest position into its upper operative position in which it comes to bear against the bottom of the article to be conveyed, which is disposed above it.

A further drive roller unit as disclosed in U.S. Pat. No. 3,698,539 has a base or main frame which is to be secured for example to the floor of an aircraft freight compartment, and a mounting frame structure which is mounted at one end pivotably to the base or main frame. In the vicinity of the pivot axis the mounting frame structure carries a motor while at a spacing relative to the pivot axis it has a drive roller which is mounted in such a way as to be rotatable about an axis which is stationary with respect to the mounting frame structure, as well as a cam control arrangement which is connected to the free end of the mounting frame structure and by means of which the mounting frame structure is pivotable relative to the main frame from the rest position into the operative position. The output shaft of the motor is connected by way of a transmission train to the input of a planetary transmission, of which one output is coupled by way of a transmission arrangement to the drive shaft of the drive roller while the other output of the planetary transmission drives the cam control unit.

In the rest condition the mounting frame structure lies on the main frame so that the drive roller is disposed in a lowered condition at a spacing from the bottom of a freight container positioned above same on a roller conveyor track. In order for the freight container to be set in motion on the roller track, the motor is firstly switched on, to drive the input of the planetary transmission. At that time the drive roller is prevented from rotating by means of a slipping clutch with a predetermined braking torque so that the drive moment of the motor inevitably acts by way of the other output of the planetary transmission on the cam control unit which, as a result, by virtue of its cams bearing against the main frame, pivots the mounting frame structure upwardly into the operative position until the drive roller comes into engagement with the underside of the bottom of the freight container. The weight of the freight container causes the movement of the cam control unit to be blocked thereby, with the drive roller being pressed against the bottom of the container. As a result the output of the planetary transmission which drives the cam control unit is also blocked so that the other output of the planetary transmission, which is coupled to the drive roller, transmits to the drive roller a braking torque which overcomes the braking torque of the slipping clutch so that the drive roller, while being pressed against the bottom of the container, begins to rotate and the container is moved forwardly in a direction which depends on the direction of rotation of the drive motor.

A problem which arises with that arrangement in a practical situation is that the entire transmission arrangement from the motor to the drive roller on the one hand and to the cam control assembly on the other hand is of a very expensive design configuration and comprises a large number of components. In addition a cam control assembly is required so that the overall construction involves a large number of mechanically moved components. As a result, not only does the arrangement involve a high level of manufacturing costs but it is also of large size and high weight which is extremely undesirable in regard to aircraft construction. In addition the large number of components which move relative to each other gives rise to susceptibility to wear and short periods of time between maintenance operations are required in order to guarantee the high level of reliability required in operating aircraft.

In particular in the above-discussed drive roller unit the individual components are disposed more or less without protection in a juxtaposed arrangement so that in operation it is not only necessary to reckon on the assembly suffering from fouling and operational faults which are caused thereby, but it is also susceptible to damage caused by objects penetrating into the mechanism or due to the direct action of a force thereon.

A drive roller unit which is similar in terms of design and mode of operation is also to be found in U.S. Pat. No. 4,697,694. However besides being of large size, that arrangement may also suffer in operation from problems due to foreign bodies penetrating into the mechanism or due to the effect of a force acting thereon.

SUMMARY OF THE INVENTION

An object of the present invention is to provide a drive roller unit of improved reliability and with a simplified design configuration.

Another object of the invention is a drive roller unit for driving an article on a conveyor track, which is suited to operation in an aircraft by virtue of being of compact size and low weight.

Still another object of this invention is to provide a drive roller unit for displacing an article such as a container in a conveyor, which involves a low level of maintenance demand and a high degree of robustness.

These and other objects are attained by a drive roller unit in accordance with the teachings of the invention.

The configuration according to the invention provides that the individual components required in the drive roller unit are considerably reduced in number relative to the above-discussed prior-art assemblies so that the unit of the invention not only provides a simple, robust and low-maintenance structure but it is also low in weight.

In a preferred feature of the invention, it is possible for the rotor and the stator of the electric motor means to be arranged in concentric relationship with each other and with the drive roller. That arrangement provides for particularly good utilisation of the space within the hollow-cylindrical drive roller so that a drive roller unit of given outside dimensions can use a large and therefore also powerful electric motor.

It must be noted at this point that usage of the terms 'rotor' and 'stator' in this specification in relation to the electric motor means is not entirely correct in terms of their strict meaning for, as will be described hereinafter, both the 'stator' and also the 'rotor' rotate in operation of the unit. Those components are the two motor elements which any electric motor must necessarily have, namely the two motor elements between which the torque of the electric motor acts in operation thereof: As the 'rotor' of conventional electric motors is generally usually mounted concentrically within the stator, that terminology has been adopted herein for the sake of convenience and clarity to identify the inwardly disposed element of the electric motor means, in which respect, in accordance with the configuration according to the invention, it may be appropriate for the inwardly disposed 'rotor' to be that component of the motor which in operation must be supplied with current from the exterior, in order to produce an electromagnetic field. As will be apparent from the following functional description, in actual fact the outwardly disposed motor element which is referred to herein as the 'stator' is that motor element which in operation of the drive roller unit for conveying an article, performs a rotational movement together with the drive roller, while the inwardly disposed motor element performs a rotary movement only initially when the drive roller is moved upwardly from a lower rest position into an upper drive position.

As will become more readily apparent from the description of preferred embodiments hereinafter, when switched on, the drive roller and the stator which is non-rotatably connected thereto initially remain in a stationary condition because of its inherent inertia or because it is subjected to a braking force as will be described hereinafter. Because of the torque acting in the electric motor means between the rotor and the stator, the inwardly disposed rotor therefore begins to rotate, with the result that the runner wheel which is rigidly and non-rotatably connected to the rotor shaft is also caused to rotate. That runner wheel is in engagement with a guide track along which it begins to roll as a result of the rotary movement thereof. As the guide track extends upwardly with respect to the base, the runner wheel is also moved upwardly relative to the base. In that lifting movement, the runner wheel also entrains the drive roller upwardly, by way of the shaft of the rotor and the electric motor means, so that the drive roller moves from its lower rest position into its upper drive position in which it is pressed against the underside of an article to be conveyed. The weight of the article to be conveyed causes that movement of the drive roller in an upward direction to be blocked so that the rolling movement of the runner wheel on the guide track is also stopped and as a result that rotor must come to a halt. Because of the torque which continues to act between the rotor and the stator in the electric motor means, the inherent inertia or the braking effect in respect of the drive roller and the stator connected thereto is now overcome so that the drive roller with the stator is caused to rotate. That rotary movement of the drive roller, while being pressed against the underside of the article to be conveyed, applies a tangential force to the article so that, as desired, the article begins to move along the conveyor track.

With the drive roller unit according to the invention, the article to be driven such as a freight container normally lies on the drive roller when in the rest position and holds it fast with a braking moment which is determined by the weight of the article. Therefore, when the unit is switched on, the drive roller is subjected to a braking effect which prevents it from rotating, with the result that the above-discussed upward movement of the drive roller from the lower rest position into the upper drive position begins. As in the described situation the article is already lying on the drive roller and is of a suitable weight, that lifting movement can occur only due to elasticity of the components of the article or the drive roller so that the roller performs an only quite minor lifting movement, but in so doing it is pressed firmly against the bottom of the article to be conveyed.

If it is desired that, when the unit is switched on, the lifting movement of the drive roller out of the rest position thereof occurs even without an article to be conveyed lying thereon, it may be provided that the drive roller is braked relative to the base by suitable means, in addition to its inherent inertia, in order thereby to start the initial lifting movement.

A preferred feature of the invention provides that the guide track is in the form of a guide wheel which is rigidly and non-rotatably connected to the base of the unit and against which the runner wheel rolls, the guide wheel and the runner wheel being held in engagement with each other by a mounting housing. The mounting housing is mounted rotatably relative to the base about an axis of rotation which is concentric with respect to the guide wheel.

In that embodiment the guide wheel and the runner wheel may be for example in frictional engagement with each other so that, when the unit is switched on, the runner wheel rolls upwardly on the guide wheel relative to the base, and in so doing moves the drive roller into the upper operational or drive position. That arrangement has the advantage that the guide track in the form of a guide wheel is easy to produce.

The above-discussed construction may be of a particularly simple design configuration if in a preferred feature the mounting housing is mounted rotatably on the rotor shaft and on a mounting shaft portion or trunnion which is fixedly connected to the base and which carries the guide wheel. That configuration, of a structurally simple form, ensures that the engagement of the guide wheel with the runner wheel is maintained during the initial lifting movement of the drive roller out of the rest position into the drive position and also ensures, during the driving operation of the drive roller in its upper drive position, by virtue of the engagement of the guide wheel with the runner wheel, that the drive roller is pressed firmly against the bottom of the article to be conveyed.

It may advantageously be provided that disposed on both axial ends of the rotor shaft is a respective runner wheel which rolls against an associated guide track. That design configuration provides that any tilting moments which may possibly be produced by the article to be driven and irregularities thereof are carried and resisted in a particularly satisfactory manner.

In another preferred feature the unit may have a runner wheel disposed only at one axial end of the rotor shaft, while the mounting housing is rotatably mounted, at the opposite axial end of the rotor shaft, on the one hand on that end of the rotor shaft and on the other hand on a mounting projection which is fixedly connected to the base and which is concentric with respect to the mounting shaft portion or trunnion carrying the guide wheel. That construction can also provide that tilting moments are satisfactorily carried by the mounting projection.

In a further advantageous feature in that arrangement, the mounting housing which is mounted on the two ends of the rotor shaft may be of an integral construction, or it may be built up from components which are fixedly connected together, so that irregular loadings at the oppositely disposed axial ends of the drive roller cannot result in the axis of rotation thereof tilting.

A further modified embodiment may provide that a runner wheel which rolls on an associated guide track is disposed at each of the two axial ends of the rotor shaft and that each guide track is in the form of a substantially V-shaped or U-shaped guide track formed in a recess in the base or fixedly mounted to the base. In that construction which is of a particularly simple structure, with a minimum number of components, the guide track formed in a recess in the base or in a component which can be fixedly connected to the base may be adapted in respect of its shape and its upwardly extending inclination to specific requirements in regard to the lifting movement of the drive roller in going from its rest position into its operative or drive position. That possibility is afforded by virtue of the fact that, during the lifting movement, after the power to the drive roller unit is switched on, each runner wheel rolls upwardly along the guide track in moving from a lower central position thereof, and in that respect the shape of the guide track determines the extent and the characteristic of the lifting movement.

Preferably the or each guide track in that construction is in the form of a tooth arrangement with which the runner wheel, in the form of a toothed wheel, is in meshing engagement. In comparison with a construction in which the runner wheel is only in friction engagement with the guide track, that construction can ensure that guide track and runner wheel are in positive interengagement so that tilting moments which are applied to the drive roller by the article to be conveyed cannot result in the drive roller tilting or twisting relative to the guide track.

In the other embodiments described further above herein also it may advantageously be provided that the guide track is in the form of a toothed wheel with which the runner wheel, in the form of a toothed wheel, is in meshing engagement. As described hereinbefore, that avoids tilting of the axis of rotation of the drive roller relative to the base, even when there are forces which act in a non-uniform manner on the two axial ends of the drive roller.

Another advantageous configuration of the drive roller unit according to the invention provides that the assembly consisting of the drive roller and the electric motor means has a distribution of mass which is eccentric with respect to the rotor shaft. That eccentric distribution of mass provides, when the drive roller unit is switched on, that there is a particularly high level of braking of inertia in respect of the drive roller and the stator which is fixedly connected thereto, so that it is the rotor which initially begins to rotate whereby the drive roller is caused to rise from the lower rest position into the upper operative position, without the need for the drive roller to be subjected to a particular braking effect, relative to the base. Such a design configuration can therefore ensure that the lifting movement of the drive roller unit when the unit is switched on takes place even when an article to be conveyed is not yet lying on the drive roller to brake it.

Further objects, features and advantages of the present invention will be apparent from the following description of preferred embodiments.

DESCRIPTION OF PREFERRED EMBODIMENTS

Figure 1:
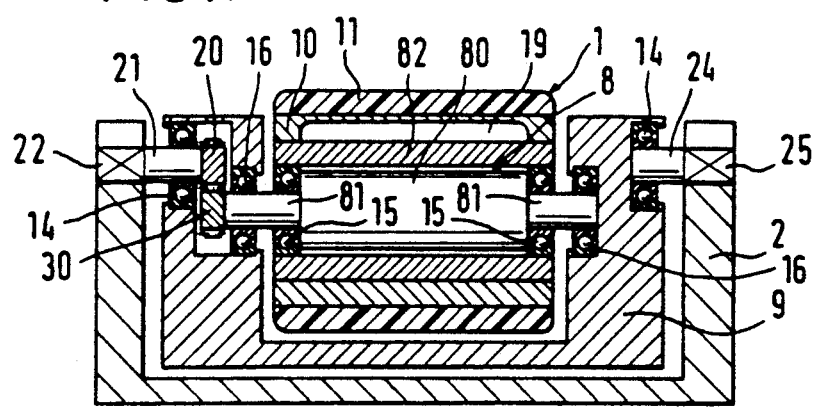
FIG. 1 is a highly diagrammatic vertical longitudinal section of a first embodiment of a drive roller unit according to the invention.

Referring to FIG. 1, the basic construction and the mode of operation of a first embodiment of a drive roller unit according to the invention will first be described. FIG. 1 is shown in highly simplified and diagrammatic form for the purposes of the description and for better comprehension of the principle of the invention.

As FIG. 1 shows, the drive roller unit basically comprises a drive roller 1 which is substantially in the form of a hollow circular cylinder and the interior of which accommodates an electric motor means 8. The electric motor means 8 is connected to a guide means comprising components 20 and 30 which are held together by a mounting housing 9 mounted rotatably with respect to the base 2, serving for upward movement of the drive roller 1 from the lower rest position into the upper drive position.

The drive roller 1 comprises an inner roller body 10 and a roller casing portion 11 which covers the outside of the roller body 10 and which is made from elastic wear-resistant material, while the roller body 10 itself is made from rigid material, for example metal. Formed in the part of the roller body 10 which is at the top in FIG. 1 is a recess or opening 19 which produces an eccentric distribution of mass of the drive roller 1, with respect to its axis of rotation.

The electric motor means 8 which is arranged in the interior of the hollow-cylindrical drive roller 1 essentially comprises a stator 82 and a rotor 80 which is mounted rotatably in concentric relationship within the stator 82 by means of the rolling bearings 15. It should be noted at this point that the terms 'rotor' and 'stator' of the electric motor means 8 are not used in their strict meaning but only for the sake of convenience and to facilitate the description of the mode of operation with respect to the conventional and generally usual structure of an electric motor. In that respect attention is directed to the discussion on this point in the introductory part of the present description.

The supply of power to the electric motor means 8 in this embodiment is by way of the inwardly disposed rotor 80 which is connected to the power supply of the base 2 by way of a contact and slip ring arrangement (not shown).

An essential consideration is that the drive roller 1 is rigidly and non-rotatably connected by way of its roller body 10 to the outwardly disposed stator 82 of the electric motor means 8 and the rotor 80 is mounted rotatably within the stator 82 by means of the rolling bearings 15.

The portion of the shaft 81 of the rotor, which is shown at the left in FIG. 1 and which is mounted in the left-hand rolling bearing 15 in the stator 82 carries at its left-hand end a runner wheel 30 which is in the form of a toothed wheel and which is in meshing engagement with a further toothed wheel which serves as a guide track as indicated at 20. The further toothed wheel which serves as the guide track 20 is rigidly and non-rotatably fixed on a mounting shaft portion or trunnion 21 which is rigidly and non-rotatably connected to the base 2 by way of a square portion 22 thereon.

The meshing engagement between the runner wheel 30 and the guide track 20 is ensured by a mounting housing 9 which surrounds the two toothed wheels forming the runner wheel 30 and the guide track 20 and which is rotatably mounted on the one hand on the mounting shaft portion or trunnion 21 and on the other hand on the rotor shaft 81 of the rotor 80 of the electric motor means 8. In the lower part of the base 2, the mounting housing 9 is extended at a spacing around the drive roller towards the right in FIG. 1 and in the right-hand part thereof has a kind of mounting flange which on the one hand carries the right-hand portion of the rotor shaft 81 by means of a rolling bearing 16 and, in eccentric relationship therewith, a mounting shaft portion or trunnion 24 which is supported therein by way of a rolling bearing 14 and which is rigidly and non-rotatably connected to the base 2 by means of a square portion 25.

In that arrangement therefore the mounting housing is mounted rotatably on the rotor shaft 81 on the one hand and on the other hand is mounted in eccentric relationship thereto rotatably about the mounting shaft portions or trunnions 21 and 24, wherein the mounting shaft portion or trunnion 21 is disposed concentrically with respect to the guide track 20 which is in the form of a toothed wheel and with which the runner wheel 30 meshes.

FIG. 1 shows the rest position of the drive roller 1 in a lowered condition in which it can be out of engagement with an article (not shown) to be conveyed, which rests on an associated roller conveyor track.

If now, starting from that rest condition, the supply of power to the electric motor means 8 is switched on, then, as in any other electric motor, a torque acts between the rotor 80 and the stator 82. As the stator 82 and the drive roller 1 which is fixedly connected thereto have a greater moment of inertia than the other components, and moreover the driver roller 1, by virtue of its opening or recess 19, has an eccentric distribution of mass which applies a braking effect thereto to prevent it from rotating out of its rest position, the inwardly disposed rotor 80 initially begins to rotate, driving the runner wheel 30 in rotation as it does so. The runner wheel 30 is in meshing engagement with the guide track 20 in the form of a toothed wheel, and therefore, by virtue of its rotary movement, rolls against the guide track 20 and, as it does so, moves upwardly and, in that rolling movement, entrains the assembly of the drive roller 1 and the electric motor means 8 upwardly out of its lower rest position into the upper drive position until the drive roller 1 encounters the underside of an article to be conveyed, and is pressed against that underside. Because of the weight of the article, further movement of the drive roller 1 and therewith also the rolling movement of the runner wheel 30 are blocked. The runner wheel 30 can therefore not rotate any further, and accordingly the rotor 80 of the electric motor means 8, which is non-rotatably coupled to the runner wheel 30, also is unable to rotate. As however the torque in the electric motor means 8 continues to act, the stator 82 must now necessarily begin to rotate and, in rotating in that fashion, it entrains and rotates the drive roller 1 which is fixedly connected thereto. That rotary movement of the drive roller 1 which is pressed against the underside of the article to be conveyed applies a tangential force to the article so that the article is set in motion, as desired.

In regard to the above-described mode of operation, it is assumed that initially, when the drive roller unit is switched on, there is no article bearing on the drive roller and that nonetheless it is desired in that condition that the drive roller should move upwardly into its operative position. It is therefore in order to assist the inherent inertia of the drive roller to resist the beginning of the rotary movement thereof that the unit includes the recess or opening 19 to provide for an asymmetric distribution of mass of the assembly consisting of the drive roller 1 and the stator 82, that asymmetric distribution of mass thereby holding the drive roller 1 in its rest position. As an alternative to that arrangement, the opening or recess 19 could be omitted and instead the drive roller 1 can be braked relative to the base 2 by means of a brake.

Admittedly, in most situations of use, there is no need either for an asymmetric distribution of mass or a particular brake, as frequently, when the drive roller unit is switched on, there is already an article which is bearing thereon and the drive roller is braked to resist an initial rotary movement thereof when the drive roller unit is switched on, in such a way that the drive roller is pressed upwardly out of its lower rest position. The length of motion involved in that pivotal movement of the drive roller from its rest position into the operative position thereof is admittedly very slight in that case, but it produces the desired result, namely the drive roller is pressed upwardly against the bottom of the article to be conveyed.

If now, starting from that operative driving condition which has now been attained, the supply of power to the electric motor means 8 is switched off, the stator 82 of the electric motor means 8 also comes to a halt relative to the rotor (which in the meantime is stationary) so that the torque which urges the runner wheel 30 upwardly on the guide track 20 by means of the rotor 80 disappears and the runner wheel 30 moves downwardly again by rolling along the guide track 20, into the rest position shown in FIG. 1. When that happens, the drive roller 1 is entrained together with the electric motor means 8 so that the drive roller 1 comes out of engagement with the underside of the article to be conveyed, or at least the contact pressure with which it bears against the bottom of the article to be conveyed disappears.

Figure 2:
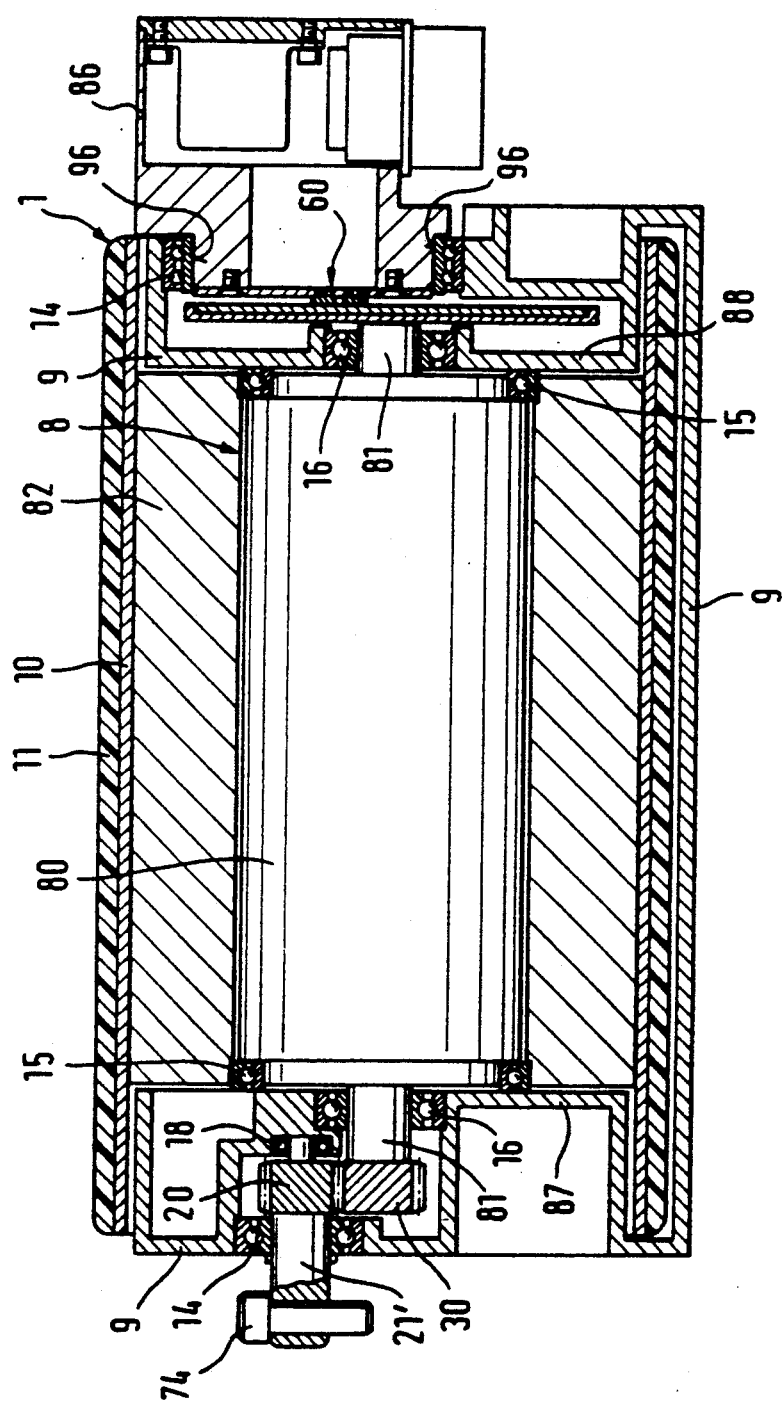
FIG. 2 is a simplified view in longitudinal section of a practical construction of the first embodiment of the drive roller unit shown in FIG. 1.

Referring now to FIG. 2, a practical construction, which is shown in simplified form in many details, of the first embodiment of the drive roller unit according to the invention, which has been described hereinbefore in principle, will be described hereinafter. In that connection, components which perform the same functions are identified by the same references, while differences to be emphasised in regard to the operationally identical components are identified by the addition of an apostrophe to the reference numeral.

As shown in FIG. 2, this practical construction again comprises an outer, substantially hollow-cylindrical drive roller 1 which once again comprises an outer roller casing portion 11 and an inner roller body 10. Accommodated in the interior of the drive roller 1 is the electric motor means 8 having a stator 82 which is rigidly and non-rotatably connected to the roller body 10 of the drive roller 1. The rotor 80 is rotatably mounted at both axial ends by means of the rolling bearings 15 in the interior of the stator 82 and concentrically with respect to the outside peripheral surface of the drive roller 1.

The axial end of the rotor shaft 81 of the rotor 80, which is at the left in FIG. 1, carries the runner wheel 30 which is in meshing engagement with the guide track 20 which is in the form of a toothed wheel. The toothed wheel 20 is rigidly and non-rotatably connected to a mounting shaft portion or trunnion 21' which can be rigidly and non-rotatably coupled to the base by means of a pin or bolt member 74.

The meshing engagement of the runner wheel 30 with the guide track 20 which is in the form of a toothed wheel is ensured by a mounting housing 9 which holds those components together and which encloses the guide track 20, the runner wheel 30 and the left-hand end of the rotor shaft 81, in the manner of a hollow body. The mounting housing 9 is mounted by means of the rolling bearing 14 on the mounting shaft portion or trunnion 21' while on the other hand it is mounted by means of the rolling bearing 16 on the left-hand portion of the rotor shaft 81. In order to carry tilting moments as between the guide track 20 and the runner wheel 30, the mounting shaft portion or trunnion 21' which carries the guide track 20 is additionally mounted, by way of its right-hand free end, to the right of the guide track 20, by way of a load-relief bearing 18 in the mounting housing 9 which, in the region just described above, represents a kind of radial mounting flange 87. The radial mounting flange at the axial end of the arrangement which is at the left in FIG. 2 is extended downwardly in the form of the mounting housing 9 at a spacing around the drive roller 1, more particularly as far as the right-hand axial part of FIG. 2. In that part the mounting housing 9 which axially embraces the drive roller 1 is again extended upwardly in the form of a radial mounting flange 88. In that region of the mounting housing 9 the right-hand portion of the rotor shaft 81 is rotatably mounted by means of a further rolling bearing 16. The mounting flange 88 of the mounting housing 9 is also rotatably mounted by means of a rolling bearing 14 on a mounting shoulder 96 which is arranged concentrically with respect to the mounting shaft portion or trunnion 21' of the guide track 20 and which is formed on a connecting housing 86. In operation the connection housing 86 is rigidly and non-rotatably connected to the base and, in regard to the mounting of the mounting housing 9, performs the same function as the mounting shaft portion or trunnion 24 in the diagrammatic view in FIG. 1.

The connecting housing 86 is in the form of a hollow body which serves on the one hand for fixing to the base, as mentioned, while on the other hand it provides for the supply of power to the electric motor means 8. The interior of the hollow body may accommodate various components such as for example a thermally operated protective circuit breaker, a connecting plug for power connection to the base, and connecting lines for a contact assembly 60 comprising slip rings and sliding contacts which serve for the supply of power to the parts of the electric motor means which are movable relative to the base. A contact assembly 60 of that kind is well known to the man skilled in the art, from the state of the art, and therefore does not need to be described in greater detail herein.

The mode of operation of the practical embodiment just described above identically corresponds to the mode of operation described in detail with reference to the diagrammatic view in FIG. 1. It only needs to be noted that, in the construction shown in FIG. 2, the eccentric distribution of mass of the drive roller 1 and the stator 82 which is connected thereto is not illustrated as on the one hand that eccentric distribution of mass is not absolutely necessary while on the other hand the man skilled in the art does not need any description of the way in which such a distribution of mass is to be achieved.

Figure 3:
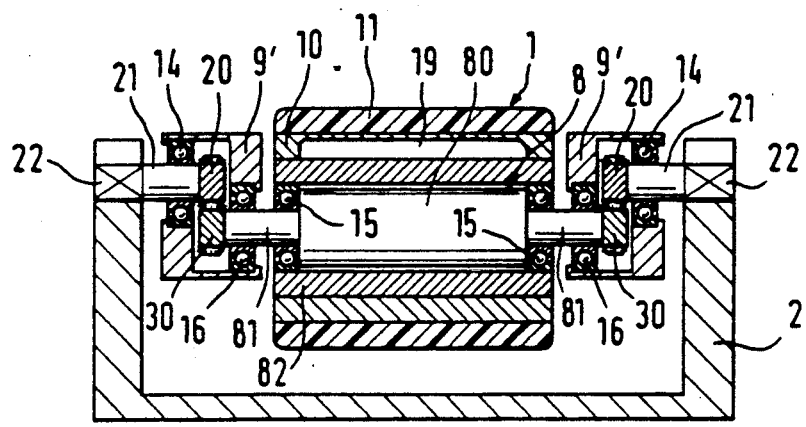
FIG. 3 is a highly diagrammatic vertical longitudinal section of a second embodiment of the drive roller unit according to the invention.

FIG. 3 is a greatly simplified and diagrammatic view of a second embodiment of the driver roller unit according to the invention. In FIG. 3, components which correspond in terms of function to components illustrated in FIGS. 1 and 2 are again identified by the same reference numerals, with differences being identified by virtue of an apostrophe added to the respective reference numeral in question.

The second embodiment shown in FIG. 3 is based on the same principle in accordance with the invention as illustrated in FIGS. 1 and 2. In accordance with FIG. 3, the drive roller unit includes a hollow-cylindrical drive roller 1, the interior of which accommodates the electric motor means 8, while the stator 82 of the electric motor means 8 is rigidly and non-rotatably connected to the drive roller 1 and the rotor 80 which is arranged in the interior of the stator 82 is mounted rotatably in the stator.

Departing from the construction shown in FIGS. 1 and 2 however, in this embodiment a respective runner wheel 30 is non-rotatably and rigidly mounted on each of the two axial ends of the rotor shaft 81. Each of the runner wheels 30 is in meshing engagement with a respective guide track 20 which is in the form of a toothed wheel. Each guide track 20 is rigidly and non-rotatably mounted to the base 2 by means of a respective mounting shaft portion or trunnion 21.

Each arrangement of interrelated guide track 20 and runner wheel 30, which form a respective guide means, is held together by a mounting housing 9' which is in the form of a respective hollow body and which is rotatably mounted both on the mounting shaft portion or trunnion 21 and also on the associated end of the rotor shaft 81. The two mounting housings 9' on the two sides of the drive roller may either be formed separately from each other or they may be rigidly connected by way of a bridge (not shown) which engages over the drive roller 1 at a spacing therefrom.

As the mode of operation of the construction shown in FIG. 3 is totally identical to that shown in FIG. 1, a description thereof will not be repeated at this point, but attention will be directed to the description relating to FIG. 1.

Figure 5:
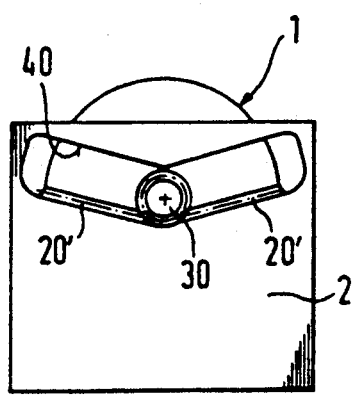
FIG. 5 is a side view of the third embodiment shown in FIG. 4.
Figure 4:
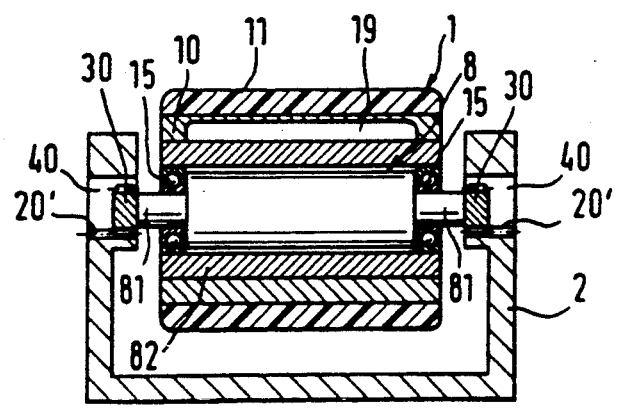
FIG. 4 is a highly diagrammatic vertical longitudinal section of a third embodiment of the drive roller unit according to the invention.

The third embodiment which is shown in FIGS. 4 and 5 is also based on the same operating principle according to the invention as the constructions shown in FIGS. 1 through 3. However the third embodiment shown in FIGS. 4 and 5 differs from the other embodiments, in particular in regard to the configuration of the guide track 20', which permits the mounting housing used in the first two embodiments to be omitted. The third embodiment involves a minimum of components.

As shown in FIGS. 4 and 5, the third embodiment therefore again includes a substantially hollow-cylindrical drive roller 1, the interior of which accommodates an electric motor means 8. The stator 82 of the electric motor means 8 is rigidly and non-rotatably connected to the drive roller 1 while the rotor 80 which is disposed in the interior of the stator is mounted rotatably therein.

As in the second embodiment shown in FIG. 3, each of the two axial ends of the rotor shaft 81 carries a respective runner wheel 30 which is rigidly and non-rotatably connected thereto and which is in meshing engagement with a respective guide track 20'.

The guide track 20' is formed in an opening 40 in a vertical part of the base 2, or is provided in a particular, suitably shaped component which is fixedly connected to the base 2.

As shown in particular in FIG. 5, the guide track 20' is in the form of a substantially V-shaped tooth arrangement or toothed rail or rack in the lower inside surface of the opening 40, with the associated runner wheel 30 meshing with that tooth arrangement.

As described hereinbefore with reference to FIG. 1, when the electric motor means is switched on, the runner wheel 30 initially rolls along the tooth arrangement and, as in the rest position it is disposed in a central position in the lowermost region, namely at the bottom apex of the V-shaped configuration of the toothed rack structure, in performing the above-indicated rolling movement along one of the upwardly extending limbs of the V-shape of the guide track 20', the runner wheel 30 must move upwardly with respect to the base. As a result, as in the case of the first two embodiments, the drive roller 1 is moved out of its lower rest position into its upper drive position and is pressed against the bottom of the article to be conveyed.

Figure 6:
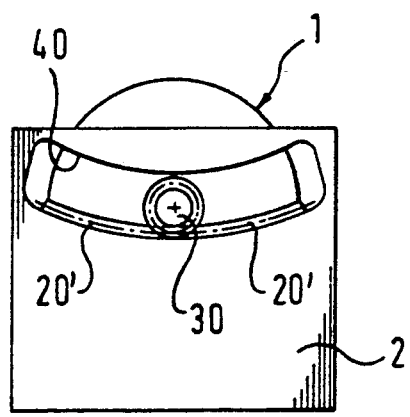
FIG. 6 is a side view of a fourth embodiment.

The guide track 20' does not necessarily have to be of a V-shaped configuration, but it is only necessary that, starting from the region of the rest position of the runner wheel 30, the guide track 20' leads upwardly relative to the base. For example therefore the guide track 20' may also be of a U-shaped configuration, as shown in FIG. 6, or may be of some other configuration of a curved nature, whereby it is possible to provide for certain characteristics in respect of the lifting movement of the drive roller for moving it from the lower rest position thereof into the upper drive position, if that is desired in specific situations.

It will be appreciated that the above-described constructions have been set forth solely by way of example and illustration of the invention and that various other modifications and alterations may be made therein without thereby departing from the spirit and scope of the invention.

What is claimed is:

1. A drive roller unit for driving an article on a conveyor track comprising:
   a base (2);
   a drive roller (1) substantially in the form of a hollow circular cylinder;
   an electric motor means (8) accommodated in the drive roller (1) and including a stator (82) and a rotor (80) having a shaft (81) and mounted rotatably within the stator (82), the drive roller (1) being rigidly and non-rotatably connected to the stator (82) in concentric relationship with the axis of rotation of the rotor (80);
   a pair of runner wheels (30, 30) each of which is rigidly and non-rotatably mounted on an axial end of said rotor shaft (81); and
   a pair of guide track means (20', 20') each of which is cooperable with one of said runner wheels (30, 30) and is in the form of an opening having, in the position of use of the unit, at least one upwardly extending track limb portion, the runner wheels (30, 30) being adapted to roll against same upon driving rotation of said rotor (80), whereby said drive roller (1) is movable relative to said base (2) between a lower rest position and an upper operative position in which said drive roller (1) is adapted to engage the underside of an article to be driven thereby.

2. A drive roller unit as set forth in claim 1, wherein each of said openings (40, 40) is provided in said base (2).

3. A drive roller unit as set forth in claim 1, wherein each of said openings is provided in a component fixedly mounted to said base (2).

4. A drive roller unit as set forth in claim 1, wherein said opening is of substantially V-shaped configuration providing two said upwardly extending track limb portions.

5. A drive roller unit as set forth in claim 1, wherein said opening is of substantially U-shaped configuration providing two said upwardly extending track limb portions.

6. A drive roller unit as set forth in claim 1, wherein the runner wheels (30, 30) are toothed wheels and wherein the guide track means (20', 20') are in the form of tooth arrangements with which the runner wheels (30, 30) are in meshing engagement.

* * * * *